United States Patent
Kim et al.

(10) Patent No.: US 9,285,641 B2
(45) Date of Patent: Mar. 15, 2016

(54) LIQUID CRYSTAL DISPLAY DEVICE AND METHOD OF FABRICATING THE SAME

(71) Applicant: LG DISPLAY CO., LTD., Seoul (KR)

(72) Inventors: ChiWan Kim, Suncheon-si (KR); JungHan Kim, Seoul (KR); YongBin Jeong, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 103 days.

(21) Appl. No.: 14/134,536

(22) Filed: Dec. 19, 2013

(65) Prior Publication Data

US 2014/0293182 A1 Oct. 2, 2014

(30) Foreign Application Priority Data

Apr. 2, 2013 (KR) .................. 10-2013-0035950

(51) Int. Cl.
| | |
|---|---|
| G02F 1/1343 | (2006.01) |
| G02F 1/1362 | (2006.01) |
| G02F 1/1335 | (2006.01) |
| G02B 27/22 | (2006.01) |
| H04N 13/04 | (2006.01) |

(52) U.S. Cl.
CPC ...... *G02F 1/136209* (2013.01); *G02B 27/2214* (2013.01); *G02F 1/133512* (2013.01); *G02F 1/134363* (2013.01); *H04N 13/0434* (2013.01)

(58) Field of Classification Search
CPC .................................................. G02F 1/134363
See application file for complete search history.

(56) References Cited

U.S. PATENT DOCUMENTS

| | | | | |
|---|---|---|---|---|
| 2002/0063835 | A1* | 5/2002 | Kim | 349/141 |
| 2009/0237578 | A1* | 9/2009 | Naka et al. | 349/33 |
| 2010/0283929 | A1* | 11/2010 | Ahn et al. | 349/43 |
| 2014/0063410 | A1* | 3/2014 | Yu et al. | 349/61 |

* cited by examiner

*Primary Examiner* — Timothy L Rude
(74) *Attorney, Agent, or Firm* — Brinks Gilson & Lione

(57) ABSTRACT

In a liquid crystal display device and a method of fabricating the same in accordance with the present invention, there is provided a liquid crystal display device with a color filter on TFT (COT) structure for a high-image quality and high-performance display, in which a light blocking pattern is formed with a double layer structure of an upper layer having a low-reflectance characteristic and a lower layer having a low-transmittance and high-conductance characteristic to replace a black matrix, thereby solving the image quality and luminance issues.

13 Claims, 13 Drawing Sheets

LIQUID CRYSTAL DISPLAY DEVICE AND METHOD OF FABRICATING THE SAME

CROSS-REFERENCE TO RELATED APPLICATIONS

This application claims the benefit of priority to Korean Patent Application No. 10-2013-0035950, filed on Apr. 2, 2013, which is hereby incorporated by reference for all purposes as if fully set forth herein.

BACKGROUND

1. Field of the Disclosure

The present disclosure relates to a liquid crystal display device and a method of fabricating the same, and more particularly, to a liquid crystal display device with a color filter on TFT (COT) structure in which a color filter is formed on an array substrate along with a thin-film transistor and a method of fabricating the same.

2. Description of the Related Art

In general, a liquid crystal display device is a display device in which data signals according to pixel information are individually supplied to pixels arranged in a matrix form to adjust the optical transmittance of the pixels, thereby displaying a desired image.

Accordingly, a liquid crystal display device may include a liquid crystal panel in which pixels are arranged in a matrix form and a drive unit configured to drive the pixels.

The liquid crystal panel may include a thin-film transistor array substrate and a color filter substrate attached to each other to maintain a uniform cell gap while facing each other, and a liquid crystal layer formed within a cell gap between the array substrate and color filter substrate.

Here, a common electrode and a pixel electrode are formed on a liquid crystal panel in which the array substrate and color filter substrate are attached to each other to apply an electric field to the liquid crystal layer.

Accordingly, when the voltage of a data signal applied to the pixel electrode is controlled in a state that a voltage is applied to the common electrode, liquid crystals in the liquid crystal layer are rotated by dielectric anisotropy according to an electric field between the common electrode and pixel electrode to allow light to be transmitted or blocked for each pixel, thereby displaying text or images.

FIG. 1 is a view schematically illustrating the cross-sectional structure of a typical liquid crystal display device, wherein part of the cross-sectional structure of a data line region is shown as an example for the sake of convenience of explanation.

Referring to FIG. 1, a typical liquid crystal display device may be configured with a liquid crystal layer (not shown) formed between two sheets of glass substrates 5, 10 while maintaining a cell gap through a column spacer 40 with respect to the glass substrates.

A gate line (not shown) and a data line 17 arranged in vertical and horizontal directions to define a pixel area are formed on the lower glass substrate 10, and a thin-film transistor, which is a switching element, is formed at a crossed region between the gate line and data line 17.

Here, though not shown in the drawing, a plurality of pixel electrodes and common electrodes are alternately formed within the pixel area.

Furthermore, the thin-film transistor may include a gate electrode connected to the gate line, a source electrode connected to the data line 17 and a drain electrode connected to the pixel electrode. In addition, the thin-film transistor may include a plurality of insulating layers 15a, 15b, 15c for insulation between the constituent elements and an active pattern configured to form a conductive channel between the source electrode and drain electrode by a gate voltage supplied to the gate electrode.

A color filter array is formed on the upper glass substrate 5, and the color filter array includes a black matrix 6, a color filter 7 and an overcoat layer 9.

SUMMARY

A liquid crystal display device includes a gate line and a data line on a first substrate, and crossed with each other to define a pixel area; a thin-film transistor at a crossed region between the gate line and data line; a color filter within the pixel area of the first substrate; a plurality of common electrodes and pixel electrodes within the pixel area of the first substrate having the color filter; a light blocking pattern at a boundary of the pixel area to perform the role of a black matrix; and the first substrate attached to face the second substrate, wherein the common electrode, pixel electrode and light blocking pattern have a double layer structure of an upper layer having a low-reflectance characteristic and a lower layer having a low-transmittance and high-conductance characteristic.

Furthermore, a method of fabricating a liquid crystal display device according to the present invention may include forming a gate line and a data line crossed with each other on a first substrate to define a pixel area; forming a thin-film transistor at a crossed region between the gate line and data line; forming a color filter within the pixel area of the first substrate; forming a plurality of common electrodes and pixel electrodes within the pixel area of the first substrate formed with the color filter; forming a light blocking pattern formed at a boundary of the pixel area to perform the role of a black matrix; and attaching the first substrate to the second substrate, wherein the common electrode, pixel electrode and light blocking pattern are formed with a double layer structure of an upper layer having a low-reflectance characteristic and a lower layer having a low-transmittance and high-conductance characteristic.

In a liquid crystal display device and a method of fabricating the same in accordance with the present invention, there is provided a liquid crystal display device with a color filter on TFT (COT) structure for a high-image quality and high-performance display, in which a light blocking pattern is formed with a double layer structure of an upper layer having a low-reflectance characteristic and a lower layer having a low-transmittance and high-conductance characteristic to replace a black matrix, thereby providing an effect of solving the image quality and luminance issues.

The light blocking pattern with such a double layer structure has an electrical characteristic similar to a low-resistance electrode in the related art as well as a low-reflectance and low-transmittance characteristic at the same time, and can be implemented only with a double layer, and thus has a characteristic capable of getting out of restriction in which the light blocking pattern should be formed with a multi-layer or high thickness having more than a triple layer. Furthermore, the light blocking pattern with the double layer structure has advantages in the aspects of cost and processes compared to a multi-layer electrode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EXEMPLARY EMBODIMENTS

Figure 1:
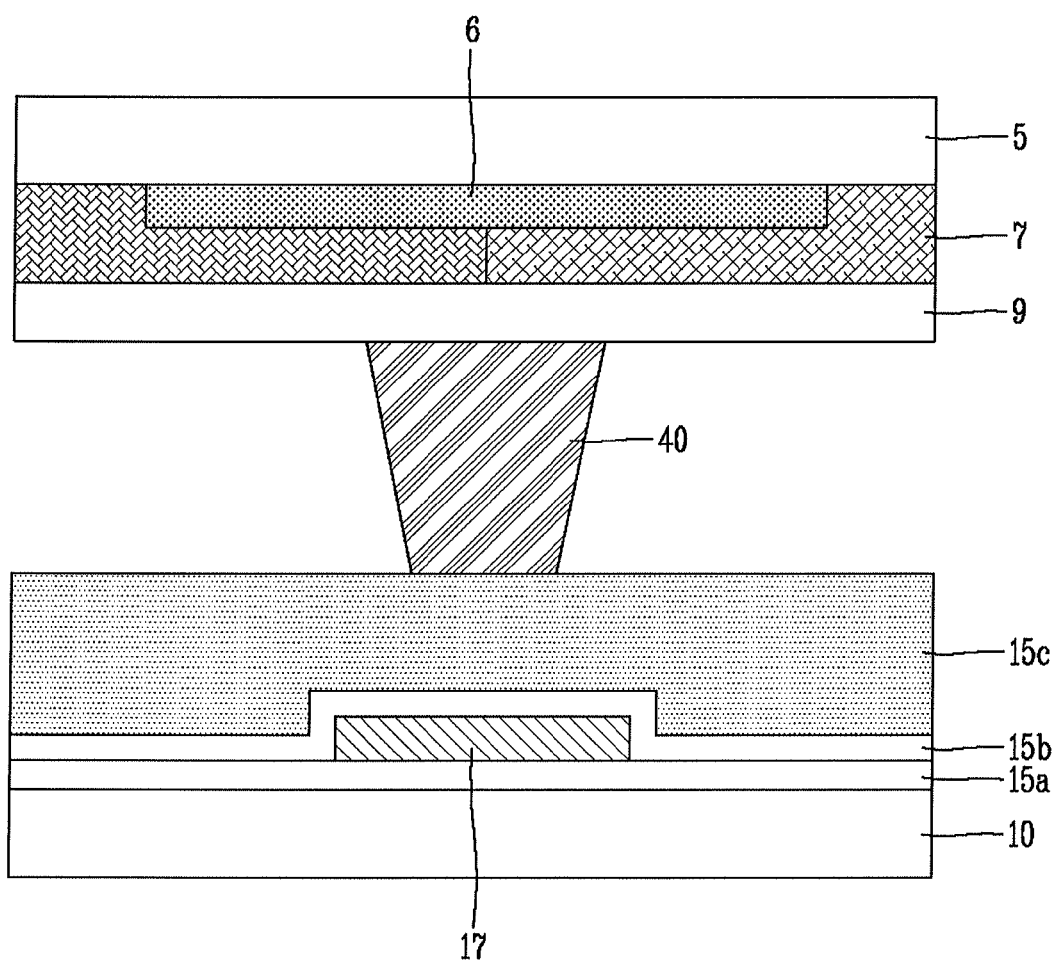
FIG. 1 is a view schematically illustrating the cross-sectional structure of a typical liquid crystal display device.

Hereinafter, a liquid crystal display device and a method of fabricating the same according to preferred embodiments of the present invention will be described in detail with reference to the accompanying drawings to such an extent that the present invention can be easily implemented by a person having ordinary skill in the art to which the present invention pertains.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present invention is to be defined only by the scope of the appended claims. Further, like reference numerals refer to like or similar elements throughout the specification.

Figure 2:
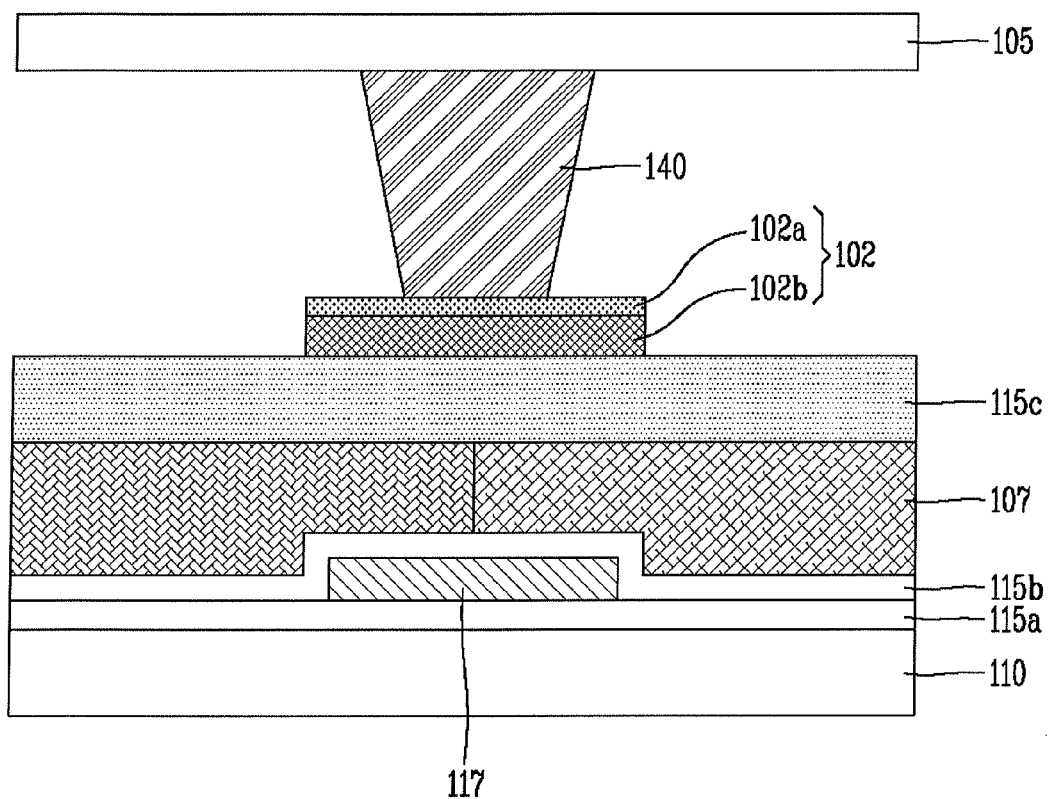
FIG. 2 is a view schematically illustrating the cross-sectional structure of a liquid crystal display device according to an embodiment of the present invention.

FIG. 2 is a view schematically illustrating the cross-sectional structure of a liquid crystal display device according to an embodiment of the present invention, in which part of the cross-sectional structure in a data line region is illustrated as an example, for the sake of convenience of explanation.

Figure 3:
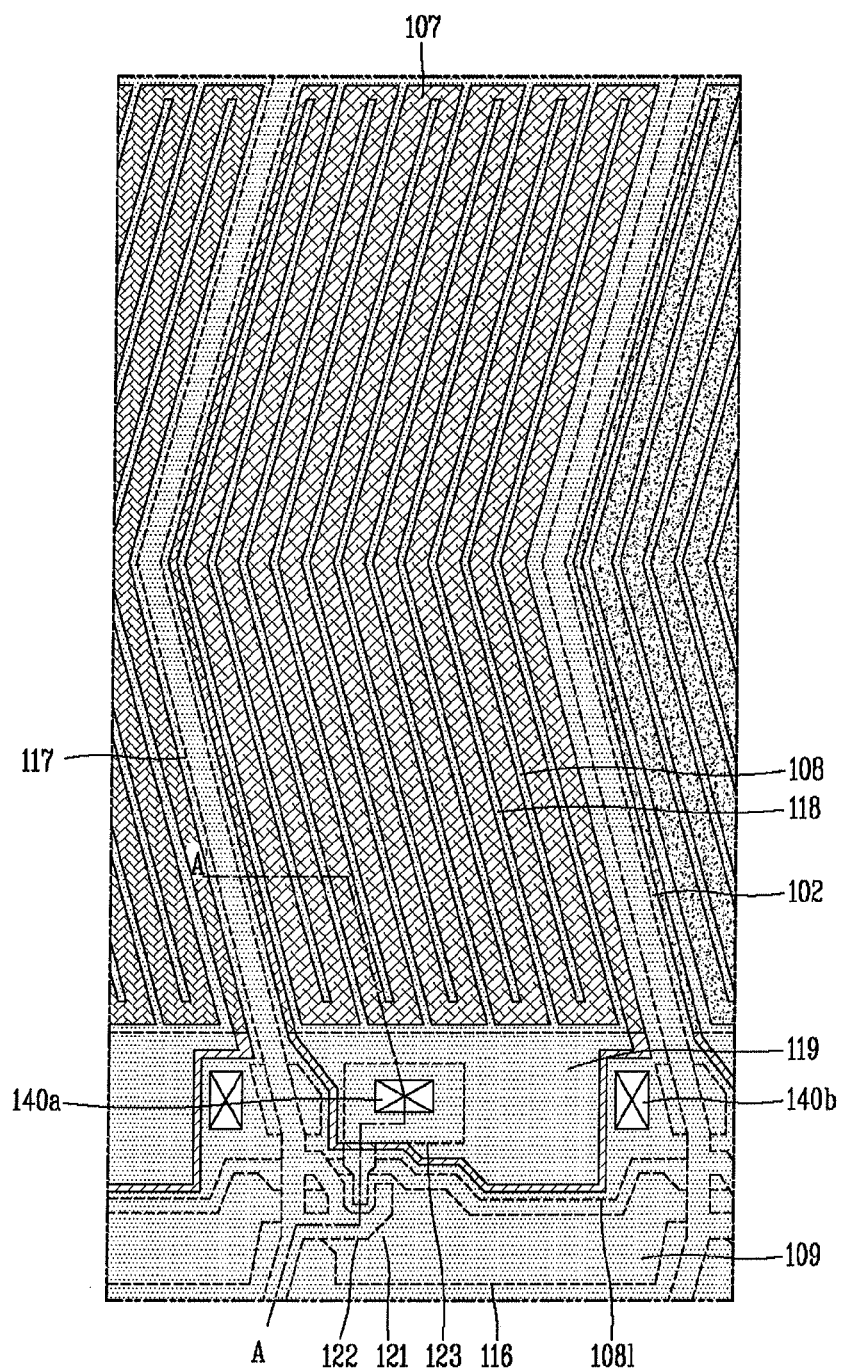
FIG. 3 is a plan view schematically illustrating part of an array substrate in a liquid crystal display device according to an embodiment of the present invention.

Furthermore, FIG. 3 is a plan view schematically illustrating part of an array substrate in a liquid crystal display device according to an embodiment of the present invention, in which part of the configuration of an in-plane switching (IPS) liquid crystal display device is illustrated as an example. However, the present invention may not be necessarily limited to the in-plane switching type liquid crystal display device.

Here, though there exist M×N pixels crossed by N gate lines and M data lines in an actual liquid crystal display device, one pixel is illustrated on the drawing, as an example, for the sake of convenience of explanation.

Figure 4:
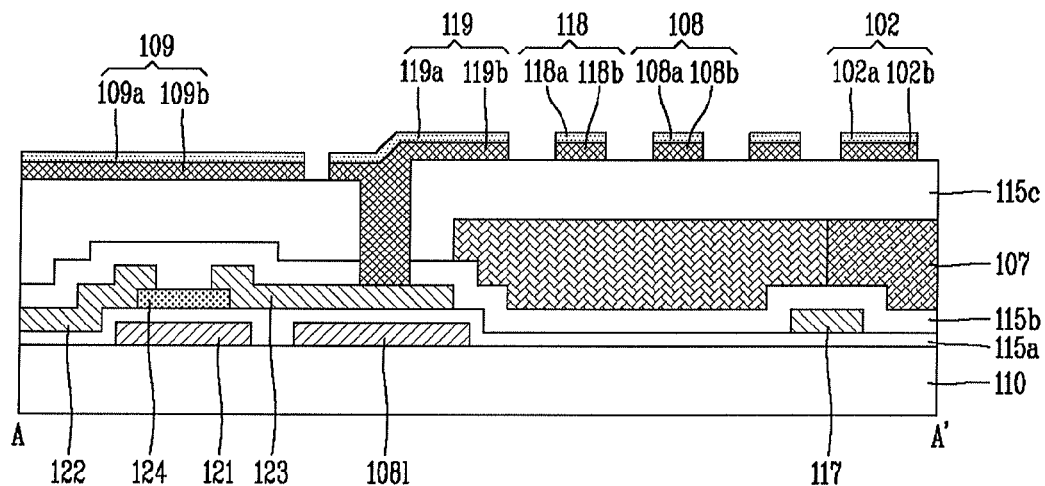
FIG. 4 is a view schematically illustrating a cross-section along line A-A' on an array substrate illustrated in FIG. 3 according to an embodiment of the present invention.

FIG. 4 is a view schematically illustrating a cross-section along line A-A' on an array substrate illustrated in FIG. 3 according to an embodiment of the present invention.

Here, as illustrated in FIGS. 3 and 4, in case where the common electrode and pixel electrode have a bending structure, liquid crystal molecules are arranged in two directions to form two domains, thereby further enhancing viewing angle characteristics compared to a mono-domain. However, the present invention may not be necessarily limited to an in-plane switching type liquid crystal display device with the 2-domain structure, and may be also applicable to an in-plane switching liquid crystal display device with a multi-domain structure having more than two domains. Furthermore, the common electrode and pixel electrode according to the present invention may not have such a bending structure.

Referring to FIGS. 2 through 4, a liquid crystal display device according to an embodiment of the present invention may be configured with a liquid crystal layer (not shown) formed between two sheets of glass substrates 105, 110 while maintaining a cell gap through a column spacer 140 with respect to the glass substrates.

Here, a lower array substrate 110 according to an embodiment of the present invention may be configured with a color filter on TFT (COT) structure in which a color filter 107 is formed along with a thin-film transistor, wherein light blocking patterns 102, 109, 119 are formed at the horizontal and vertical boundaries of a pixel area.

Here, a gate line 116 and a data line 117 arranged in vertical and horizontal directions to define a pixel area are formed on the array substrate 110. In other words, the gate line 116 supplies a scan signal from a gate driver (not shown), and the data line 117 supplies a video signal from a data driver (not shown). The gate line 116 and data line 117 are crossed with each other to define a pixel area by interposing a first insulating layer 115a therebetween.

Furthermore, a thin-film transistor, which is a switching element, is formed at a crossed region between the gate line 116 and data line 117, and a plurality of common electrodes 108 and pixel electrodes 118 for generating a horizontal electric field to drive liquid crystal molecules are alternately formed within the pixel area.

The thin-film transistor maintains a video signal on the data line 117 to be charged to the pixel electrode 118 in response to a scan signal of the gate line 116. To this end, the thin-film transistor may include a gate electrode 121 connected to the gate line 116, a source electrode 122 connected to the data line 117 and a drain electrode 123 connected to the pixel electrode 118. In addition, the thin-film transistor may include a plurality of insulating layers 115a, 115b, 115c for insulation between the constituent elements and an active layer 124 configured to form a conductive channel between the source electrode 122 and drain electrode 123 by a gate voltage supplied to the gate electrode 121.

Here, as described above, according to the present invention, the common electrode 108, pixel electrode 118 and data line 117 may be formed with a bending structure to form a multi-domain structure having a symmetry in the driving direction of liquid crystal molecules, and thus extraordinary lights due to a birefringence characteristic of liquid crystals may cancel each other, thereby minimizing a color shift phenomenon. In other words, color shift may be generated according to a viewing angle for looking at liquid crystal molecules due to the birefringence characteristic of liquid crystal molecules, and in particular, yellow shift is observed in the minor axis direction of liquid crystal molecules, and blue shift is observed in the major direction thereof. Accordingly, when the minor and major axes of liquid crystal molecules are disposed in a suitable manner, the birefringence value can be compensated, thereby reducing color shift.

The common electrode 108 may be formed with a double layer structure of an upper common electrode 108a having a low-reflectance characteristic and a lower common electrode 108b having a low-transmittance and high-conductance characteristic. An end of the first light blocking pattern 102 formed at an upper portion of the plurality of common electrodes 108 and the data line 117 is connected to the second light blocking pattern 109 parallel to the gate line 116, and the second light blocking pattern 109 is overlapped with part of the gate line 116 at a lower portion thereof. Here, the second light blocking pattern 109 is electrically connected to a common line 1081 exposed through a second contact hole 140b.

The pixel electrode 118 may be formed of the same material on the same plane as the common electrode 108. In other words, the pixel electrode 118 may be formed with a double layer structure of an upper pixel electrode 118a having a low-reflectance characteristic and a lower pixel electrode 118b having a low-transmittance and high-conductance characteristic. An end of the plurality of pixel electrodes 118 is connected to the third light blocking pattern 119 parallel to the gate line 116, and the third light blocking pattern 119 is overlapped with part of the common line 1081 at a lower portion thereof. Here, the third light blocking pattern 119 is electrically connected to a drain electrode 123 of the thin-film transistor exposed through a first contact hole 140a.

As described above, according to an embodiment of the present invention, the common line 1081 is formed of molybdenum (Mo) or a molybdenum alloy, which is a low-resistance material, in a direction parallel the gate line 116 through a mask for patterning the gate electrode 121 and gate line 116 during the array process as well as electrically connected to the common electrode 108 through the second contact hole 140b, thereby reducing the load of the common electrode 108. Accordingly, it may be possible reduce the crosstalk of an image.

Here, the second contact hole 140b is formed for each pixel, but the present invention may not be necessarily limited to this, and the formation location and number of the second contact holes 140b may be freely selected.

A reference voltage, namely, common voltage, for driving liquid crystals is supplied to the common electrode 108 through the common line 1081. Accordingly, a horizontal electric field is formed between the pixel electrode 118 supplied with a pixel voltage signal and the common electrode 108 supplied with a common voltage. Liquid crystal molecules arranged in a horizontal direction between the array substrate 110 and the upper substrate 105 by the horizontal electric field are rotated by dielectric anisotropy. Furthermore, a light transmittance for transmitting a pixel area is varied according to the rotation degree of liquid crystal molecules, thereby implementing an image.

On the other hand, according to an embodiment of the present invention, the color filter 107 is formed on the same array substrate 110 as the thin-film transistor, thereby forming a COT structure.

As an example, for the color filter 107, a red color filter, a green color filter and a blue color filter may be repeated in a sequential manner along the length direction of the gate line 116 while on the contrary, being repeated in a similar manner along the length direction of the data line 117. The red color filter, green color filter and blue color filter forms one unit pixel, and the one unit pixel displays a predetermined color image through a color light emitted through the red color filter, green color filter and blue color filter.

A liquid crystal display device having the foregoing configuration according to an embodiment of the present invention may be characterized in that a black matrix is removed and thus the foregoing light blocking patterns 102, 109, 119 are formed of a non-transparent conductive material at the horizontal and vertical boundaries of a pixel area.

The first light blocking pattern 102 is formed to cover the data line 117 at an upper portion of the data line 117, thereby preventing a color shift between adjoining pixels.

The second light blocking pattern 109 and third light blocking pattern 119 are formed at an upper portion of the gate line 116 and common line 1081, respectively, in a direction parallel to the gate line 116 at a vertical boundary of the pixel area, and the second and the third light blocking pattern 109, 119 are formed to be separated from or connected to the second and the third light blocking pattern 109, 119 of an adjoining pixel.

Here, the light blocking patterns 102, 109, 119 may be formed with a double layer structure of an upper layer having a low-reflectance characteristic and a lower layer having a low-transmittance and high-conductance characteristic similarly to those of the common electrode 108 and pixel electrode 118 when forming the 108 and pixel electrode 118 on the array substrate 110. In other words, the first light blocking pattern 102 may be formed with a double layer structure of an upper first light blocking pattern 102a having a low-reflectance characteristic and a lower first light blocking pattern 102b having a low-transmittance and high-conductance characteristic, and the second light blocking pattern 109 may be formed with a double layer structure of an upper second light blocking pattern 109a having a low-reflectance characteristic and a lower second light blocking pattern 109b having a low-transmittance and high-conductance characteristic. Furthermore, the third light blocking pattern 119 may be formed with a double layer structure of an upper third light blocking pattern 119a having a low-reflectance characteristic and a lower third light blocking pattern 119b having a low-transmittance and high-conductance characteristic.

For reference, copper, a non-transparent electrode such as aluminum, nickel, titanium, molybdenum or an alloy thereof and a transparent electrode such as indium tin oxide (ITO) are mostly used for the line electrodes in the related art. A typical black matrix performs the role of a blocking layer in a model to which the black matrix is applied, and thus there is no issues for the optical characteristics of electrodes.

However, with the development of display products, the requirement of high image quality and the reinforcement of price competitiveness through low cost are essentially required. As part of this effort, a lot of efforts have been carried out in various aspects of materials, process development and design improvement and the like. A black-matrix-less model in which the black matrix is removed to enhance the brightness of display products and improve the efficiency of back lights through transmittance enhancement in the development of high performance high image quality display products has been developed.

However, in such a black-matrix-less model, an electrode exposed area is increased, and thus a high reflectance in the electrode having a high-conductance characteristic may have an effect on the image quality and luminance. In other words, the non-transparent electrode basically has gloss to show a high reflectance characteristic, whereas the transparent electrode has a low reflectance but cannot be applied in the aspect of contrast ratio due to its high transmittance.

In such an aspect, in order to enhance the image quality and product luminance, the development of electrode materials having an excellent optical characteristic such as low reflectance and low transmittance and having a high conductance characteristic as an electrode has been required. Furthermore, a thickness of less than 600 Å is required to apply them to the common electrode and pixel electrode, but it may be difficult at such a thickness to satisfy the low-reflectance, low-transmittance, and high conductance characteristics with a single material.

As a result, the light blocking patterns 102, 109, 119 performing the role of a black matrix are formed with a double layer structure as described above, wherein a low reflectance and low-transmittance material is applied to the upper electrode due to its contribution to the whole reflectance characteristic, and a low-transmittance and low resistance material is applied to the lower electrode due to its contribution to the whole transmittance characteristic.

In other words, the upper electrode directly attributes to the reflectance of the electrode, and thus a low-reflectance characteristic is required and a low-transmittance characteristic is also required to reduce the reflection of the lower electrode. Furthermore, the lower electrode directly attributes to the whole transmittance and reflectance of the electrode, and thus metal-based materials having a low-transmittance and high-conductance characteristic may be applicable thereto, and if the reflectance is low in consideration of the reflection of light transmitted through the upper electrode, then the whole reflectance will be reduced.

Figure 5:
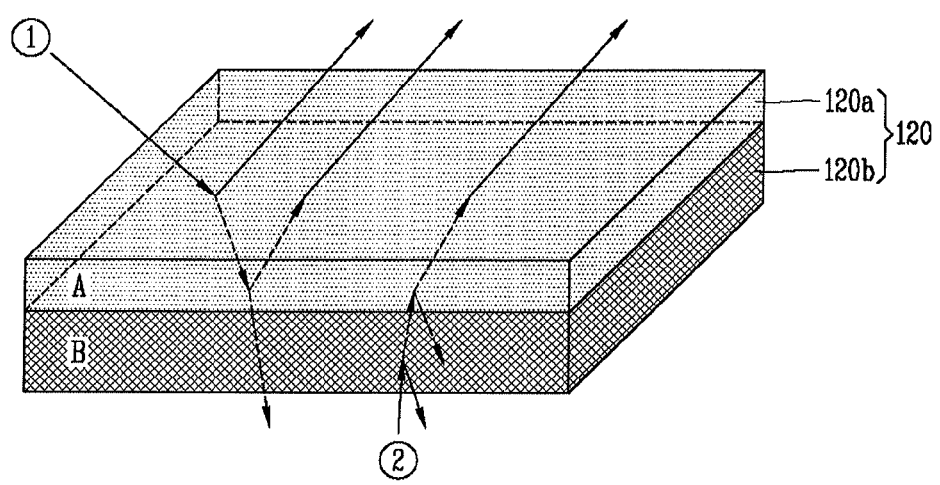
FIG. 5 is a view exemplarily illustrating the double layer structure of a light blocking pattern in a liquid crystal display device according to an embodiment of the present invention.

FIG. 5 is a view exemplarily illustrating the double layer structure of a light blocking pattern in a liquid crystal display device according to an embodiment of the present invention.

Referring to FIG. 5, it is characterized in that an electrode 120 with a double layer structure constituting a light blocking pattern according to an embodiment of the present disclosure is formed with a double layer structure of an upper layer 120a having a low-reflectance characteristic and a lower layer 120b having a low-transmittance and high-conductance characteristic.

Here, arrow (1) illustrated in the drawing schematically indicates the path of light incident to the upper layer 120a from the outside, and arrow (2) schematically indicates the path of light incident to the lower layer 120b from the inside.

The upper layer 120a contributes to the whole reflectance characteristic, and thus a low-reflectance and low-transmittance material, for example, a ceramic, metal oxide or semiconductor material may be applicable thereto. Furthermore, the lower layer 120b contributes to the whole transmittance and reflectance characteristics, and thus a low-transmittance and low-resistance material, for example, copper, aluminum, nickel, titanium, molybdenum or an alloy thereof may be applicable thereto.

The electrode 120 with such a double layer structure has an electrical characteristic similar to a low-resistance electrode in the related art as well as a low-reflectance and low-transmittance characteristic at the same time, and thus can be implemented only with a double layer, and thus has a characteristic capable of getting out of restriction in which the electrode should be formed with a multi-layer or high thickness having more than a triple layer.

For example, when the sheet resistance, transmittance and reflectance of the upper layer 120a itself are 1419.28 ohm/sq., 58.48%, and 11.31%, respectively, and the sheet resistance, transmittance and reflectance of the lower layer 120b itself are 46.6 ohm/sq., 12.11%, and 42.97%, respectively, the sheet resistance, transmittance and reflectance of the electrode 120 with a double layer structure comprised of the 120a and lower layer 120b are measured as 38.80 ohm/sq., 7.76%, and 32.55%, respectively. Here, the thickness of the upper layer 120a, lower layer 120b, and the electrode 120 with a double layer structure are 250 Å, 300 Å, and 550 Å, respectively.

Hereinafter, a method of fabricating a liquid crystal display device according to an embodiment of the present invention will be described in detail with reference to the accompanying drawings.

FIGS. 6A through 6F are plan views sequentially illustrating a process of fabricating an array substrate illustrated in FIG. 3 according to an embodiment of the present invention.

Furthermore, FIGS. 7A through 7F are plan views sequentially illustrating a process of fabricating an array substrate illustrated in FIG. 4 according to an embodiment of the present invention.

Figure 6A:
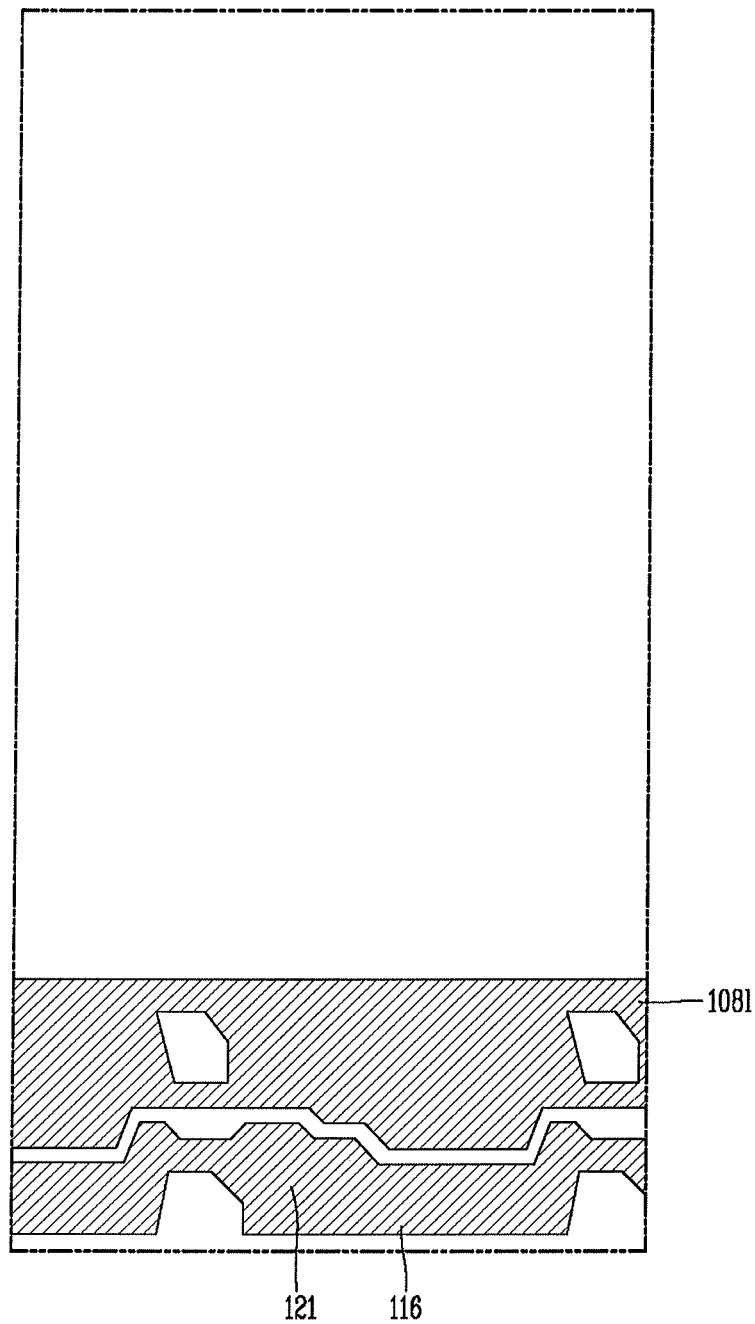
FIGS. 6A through 6F are plan views sequentially illustrating a process of fabricating an array substrate illustrated in FIG. 3 according to an embodiment of the present invention.
Figure 7A:
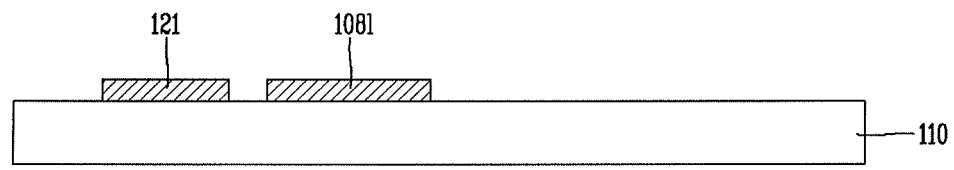
FIGS. 7A through 7F are plan views sequentially illustrating a process of fabricating an array substrate illustrated in FIG. 4 according to an embodiment of the present invention.

As illustrated in FIGS. 6A and 7A, a gate electrode 121, a gate line 116 and a common line 1081 are formed on an array substrate 110 made of a transparent insulating material such as glass.

Here, the gate electrode 121, gate line 116 and common line 1081 are formed by depositing a first conductive layer on an entire surface of the array substrate 110 and then selectively patterning it through a photolithographic process.

Here, the first conductive layer may be formed of a low-resistance non-transparent conductive material such as aluminum (Al), an aluminum (Al) alloy, tungsten (W), copper (Cu), chromium (Cr), molybdenum (Mo), a molybdenum (Mo) alloy with MoTi or the like. Furthermore, the first conductive layer may be formed with a multi-layer structure in which two or more types of the low-resistance conductive materials are deposited.

Here, the common line 1081 may be formed to be located adjacent to the upper or lower side of the gate line 116, and formed in a direction substantially parallel to the gate line 116. However, the present invention may not be necessarily limited to this.

Figure 6B:
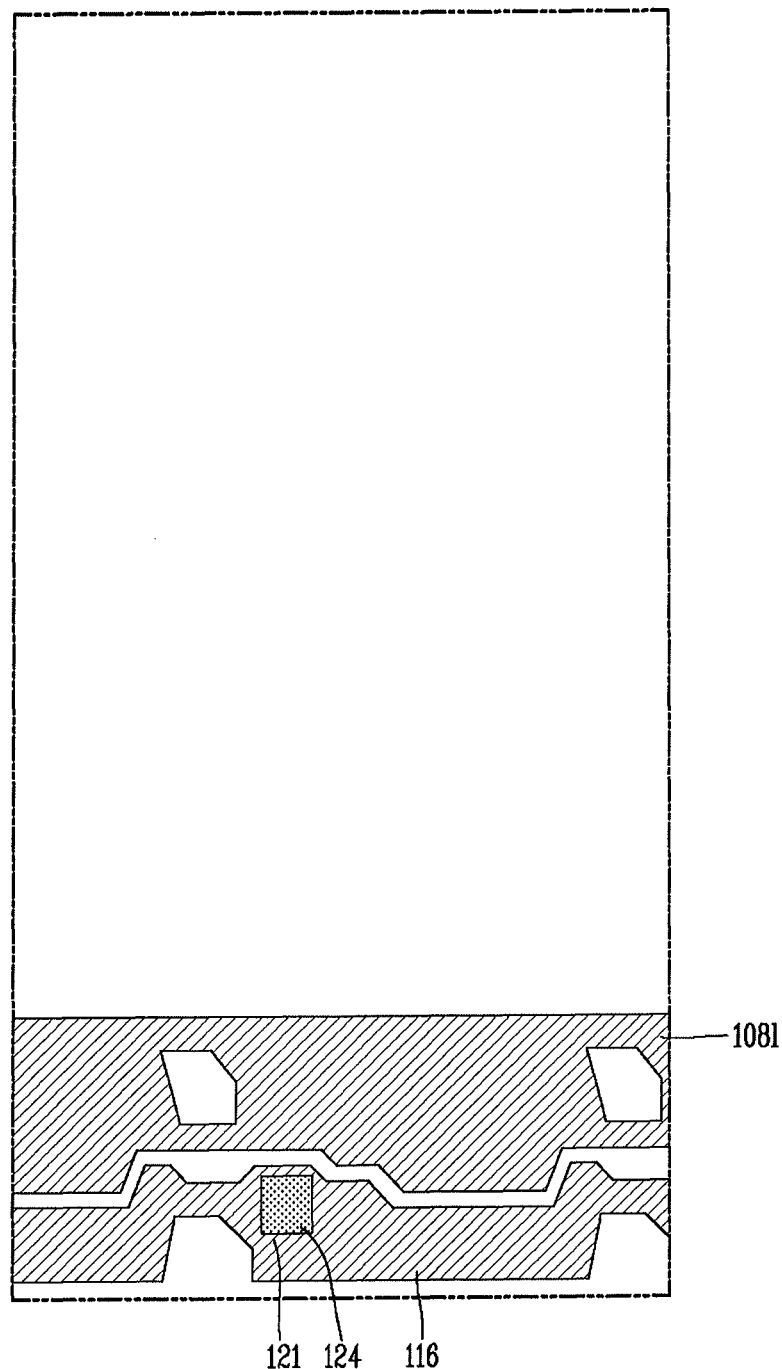
Figure 7B:
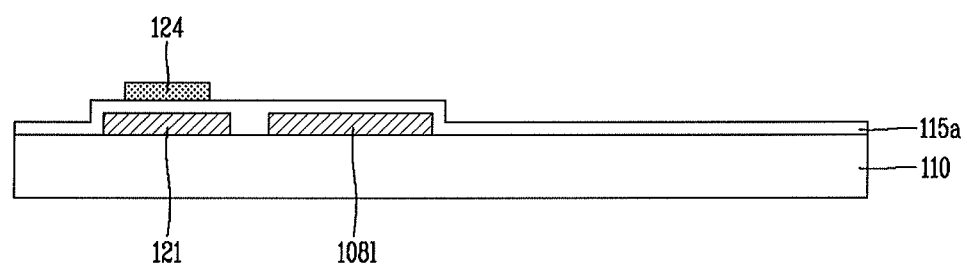

Next, as illustrated in FIGS. 6B and 7B, a first insulating layer 115a, an amorphous silicon thin layer and an n+ amorphous silicon thin layer are formed on an entire surface of the array substrate 110 formed with the gate electrode 121, gate line 116 and common line 1081.

Then, the amorphous silicon thin layer and n+ amorphous silicon thin layer are selectively removed through a photolithographic process, thereby forming an active layer 124 made of the amorphous silicon thin layer at an upper portion of the gate electrode 121 of the array substrate 110.

Here, an n+ amorphous silicon thin layer pattern (not shown) made of the n+ amorphous silicon thin layer, and patterned in a substantially same manner as the active layer is formed on the active layer.

Figure 6C:
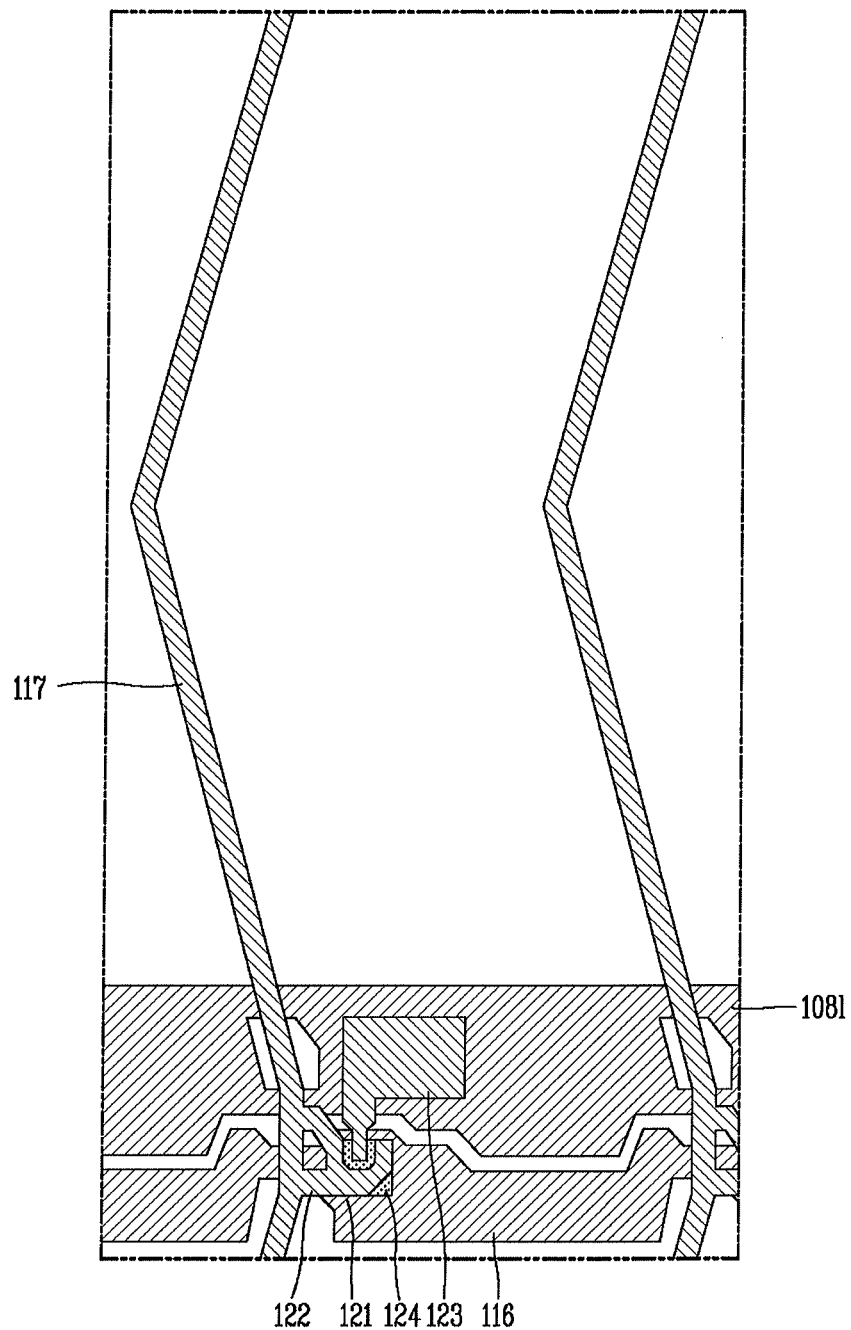
Figure 7C:
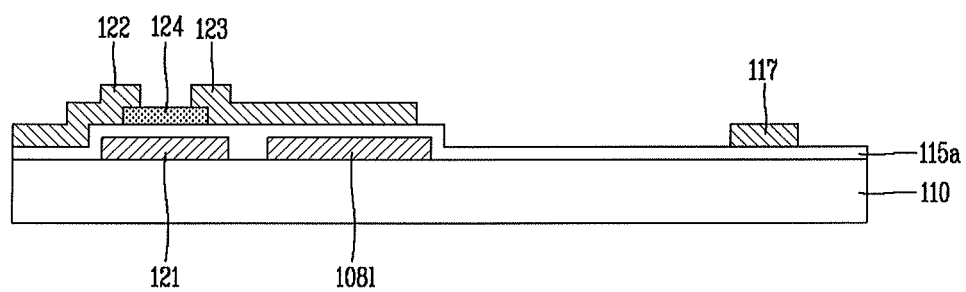

Next, as illustrated in FIGS. 6C and 7C, a second conductive layer is formed on an entire surface of the array substrate 110 formed with the active layer 124 and n+ amorphous silicon thin layer pattern.

Here, the second conductive layer may be formed of a low-resistance non-transparent material such as aluminum, an aluminum alloy, tungsten, copper, chromium, molybdenum, a molybdenum alloy with MoTi or the like to form the source electrode, drain electrode and data line. Furthermore, the second conductive layer may be formed with a multi-layer structure in which two or more types of the low-resistance conductive materials are deposited.

Then, the n+ amorphous silicon thin layer and second conductive layer are selectively removed through a photolithographic process, thereby forming the source electrode 122 and drain electrode 123 made of the second conductive layer on the active layer.

Furthermore, a data line 117 for defining a pixel area along with the gate line 116 is formed on the array substrate 110 through a photolithographic process.

Here, an ohmic-contact layer (not shown) made of the n+ amorphous silicon thin layer to ohmic contact between the source/drain area and source/drain electrodes 122, 123 of the active layer is formed on the active layer 124.

The data line 117 may be formed with a bending structure along with the common electrode and pixel electrode to be formed later, and in this case, it may be formed with a multi-domain structure having a symmetry in the driving direction of liquid crystal molecules.

Here, a case where the active layer 124, ohmic-contact layer and data line, namely, the source electrode 122, drain electrode 123 and data line 117 are individually formed through two mask processes is taken as an example, but the present invention may not be necessarily limited to this. The active layer, ohmic-contact layer and data line may be also formed with one mask process using a half-tone mask or diffraction mask.

Figure 6D:
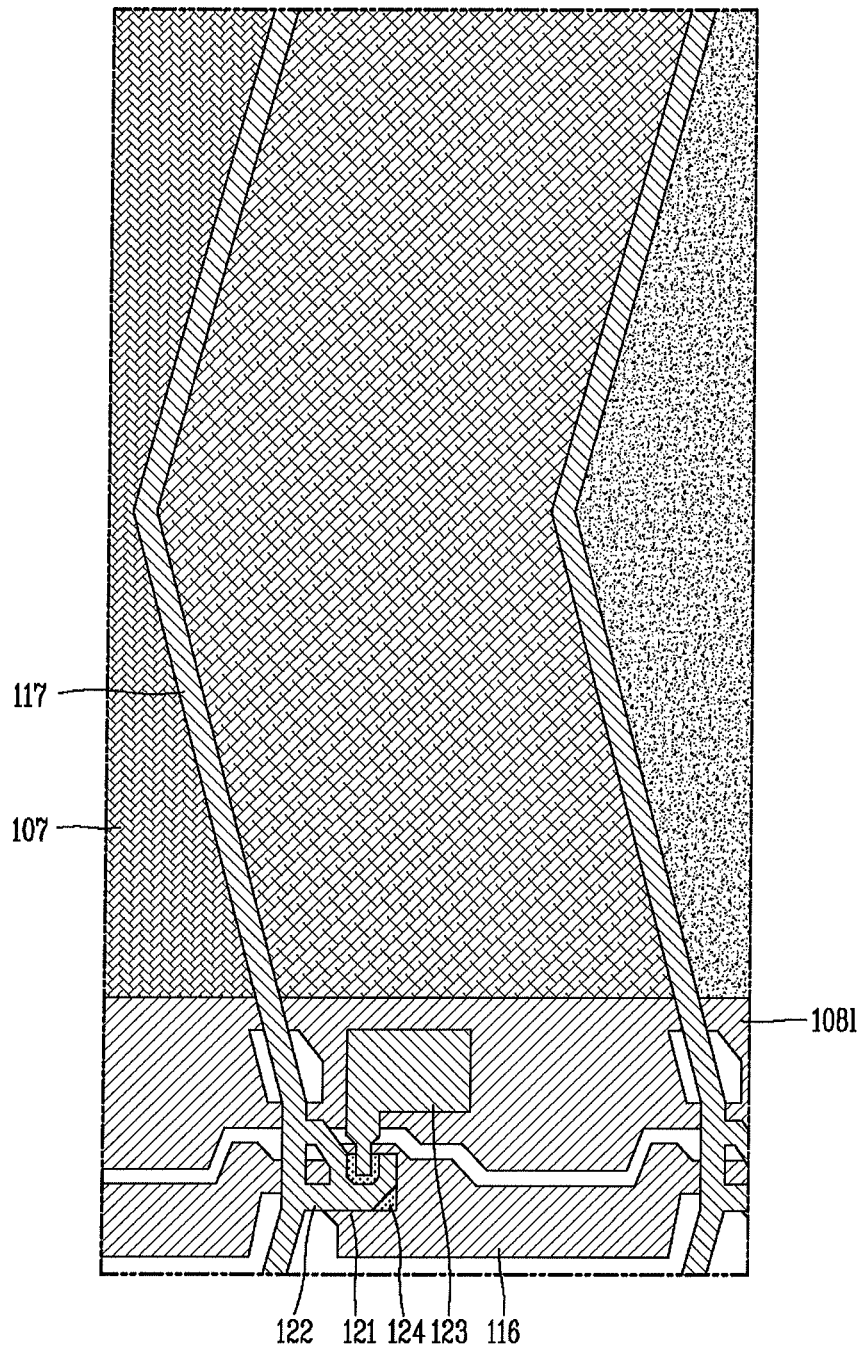
Figure 7D:
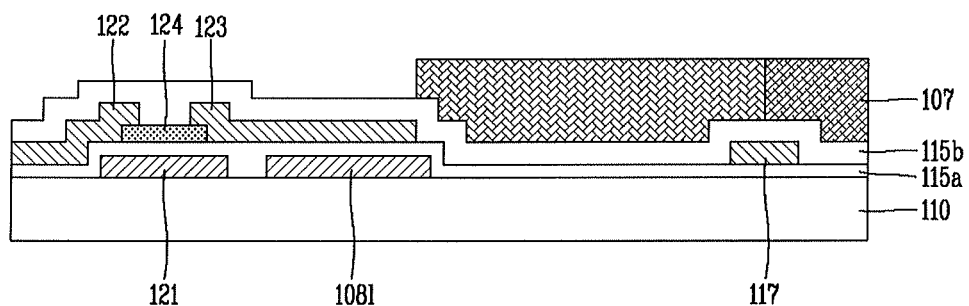

Next, as illustrated in FIGS. 6D and 7D, a second insulating layer 115b is formed on an entire surface of the array substrate 110.

Here, the second insulating layer 115b may be formed of an inorganic insulating layer such as silicon nitride (SiNx) layer or silicon oxide ($SiO_2$) layer or an organic insulating layer such as photo acryl.

Then, a red, green and blue color filter 107 is formed within a pixel area of the array substrate 110 formed with the second insulating layer 115b.

For example, a red color pigment is coated on an entire surface of the array substrate 110 formed with the second insulating layer 115b, and then patterned through a photolithographic process to form a red color filter within the red sub-pixel. Next, a green color pigment is coated on an entire surface of the array substrate 110 formed with the red color filter 107a and red color layer, and then patterned through a photolithographic process to form a green color filter within the green sub-pixel. Then, a blue color pigment is coated on an entire surface of the array substrate 110 formed with the green color filter, and then patterned through a photolithographic process to form a blue color filter within the blue sub-pixel. However, the present invention may not be necessarily limited to the formation order of the color filter 107.

Figure 6E:
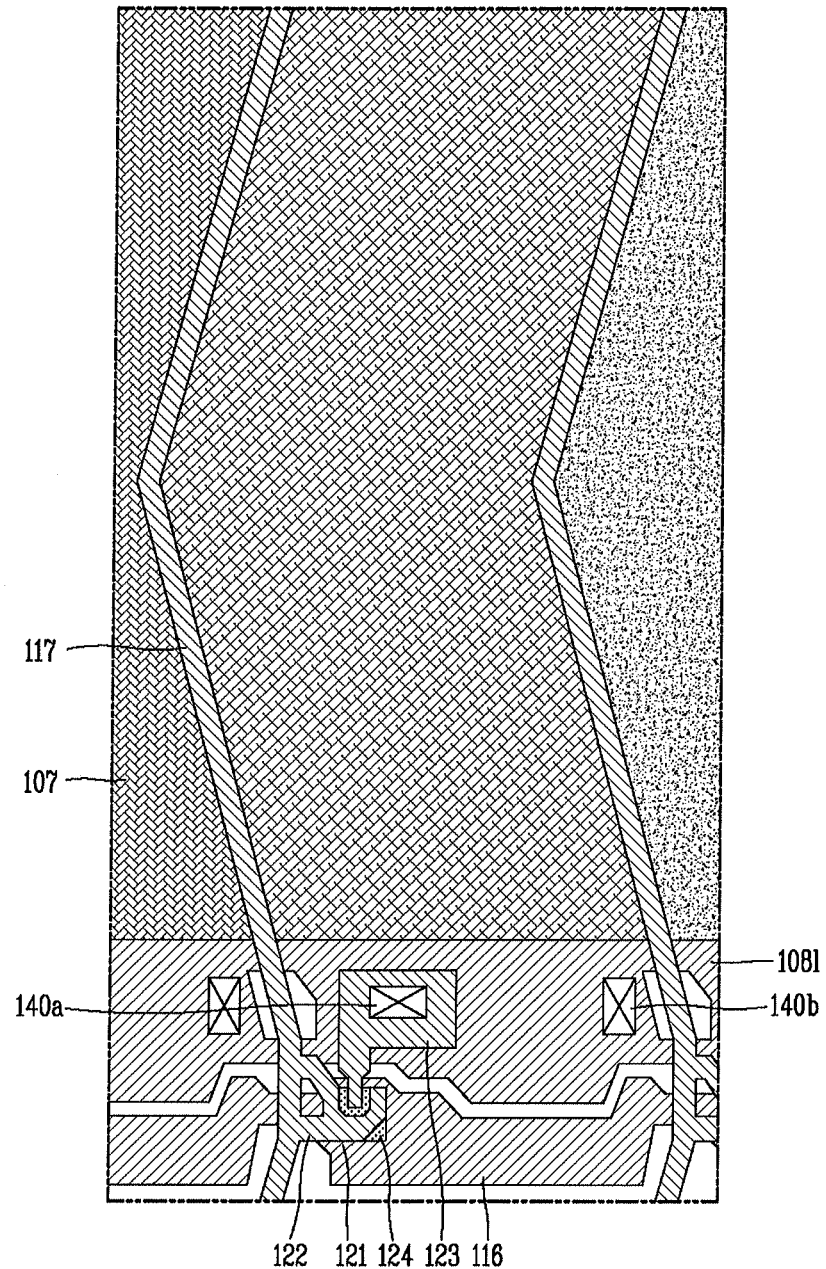
Figure 7E:
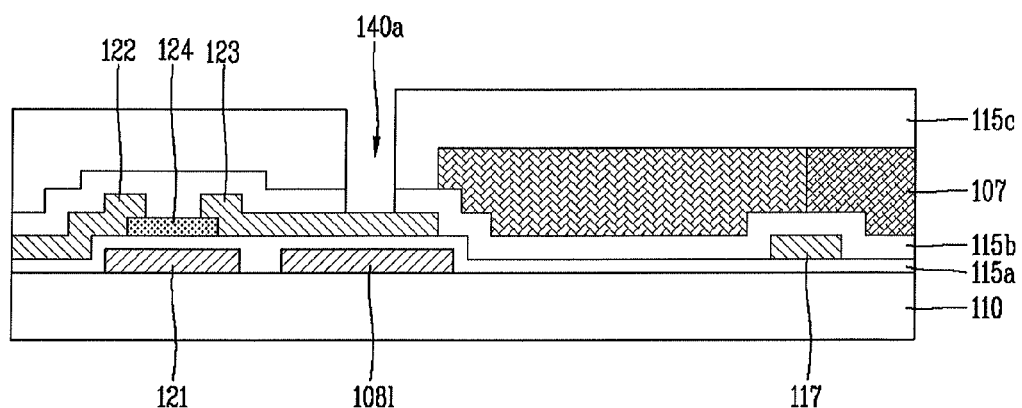

Next, as illustrated in FIGS. 6E and 7E, a third insulating layer 115c is formed on an entire surface of the array substrate 110 formed with the color filter 107.

Then, the first, the second and the third insulating layer 115a, 115b, 115c are selectively removed through a photolithographic process to form a first contact hole 140a and a second contact hole 140b for exposing part of the drain electrode 123 and common line 1081, respectively.

Here, as described above, the second contact hole 140b is formed for each pixel, but the present invention may not be necessarily limited to this, and the formation location and number of the second contact holes 140b may be freely selected.

Figure 6F:
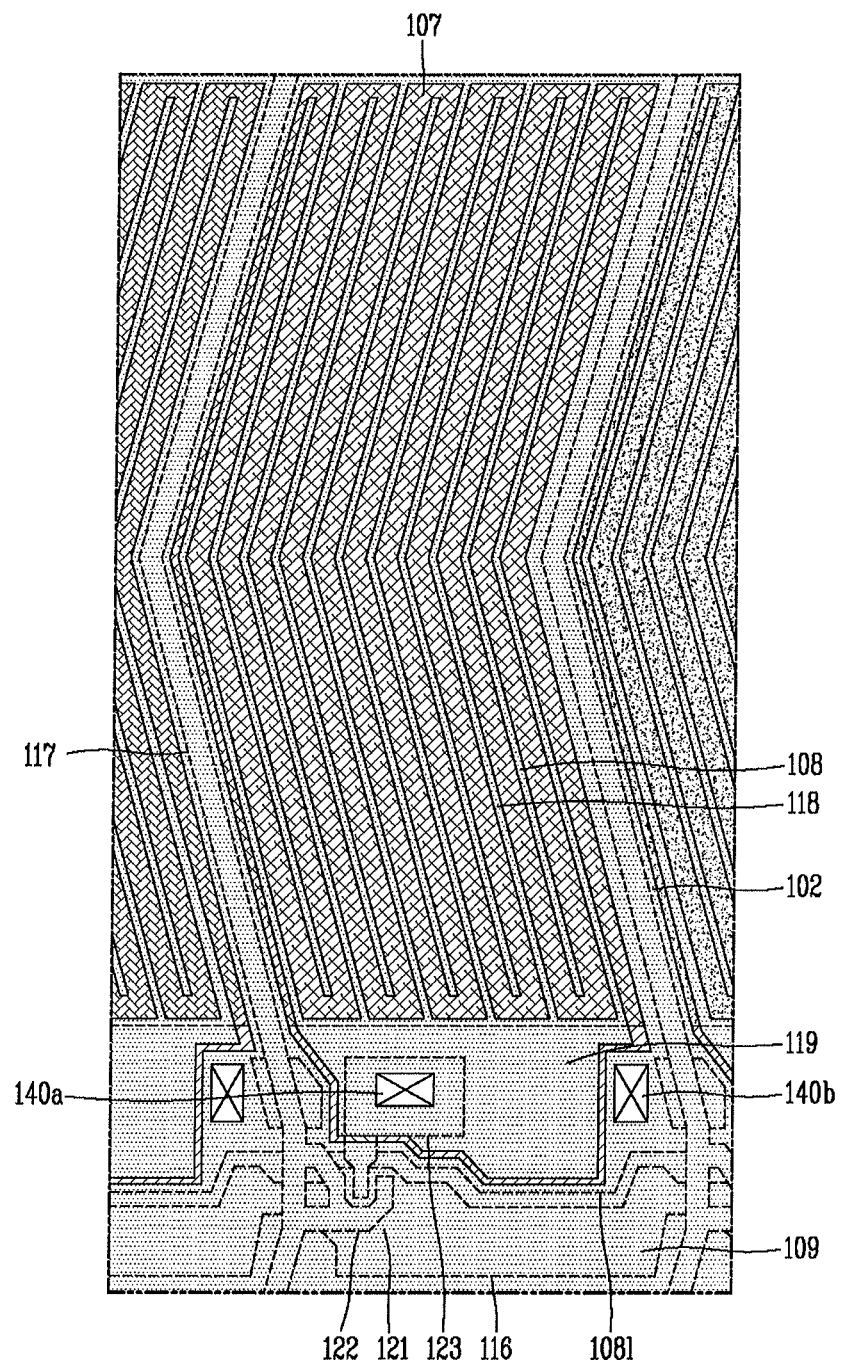
Figure 7F:
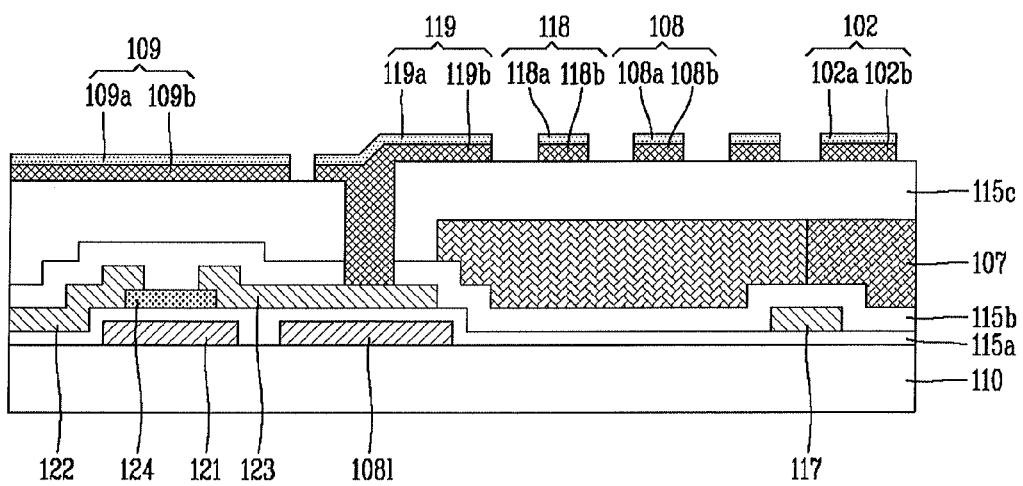

Next, as illustrated in FIGS. 6F and 7F, a third conductive layer and a fourth conductive layer are formed on an entire surface of the array substrate 110 formed with the third insulating layer 115c.

The third conductive layer and fourth conductive layer may form a common electrode, a pixel electrode and a light blocking pattern with a double layer structure as described above, wherein the third conductive layer constituting the upper electrode contributes to the whole reflectance characteristic, and thus a low-reflectance and low-transmittance material, for example, a ceramic, metal oxide or semiconductor material may be applicable thereto. Furthermore, the fourth conductive layer constituting the lower electrode contributes to the whole transmittance and conductance characteristics, and thus a low-resistance material, for example, copper, aluminum, nickel, titanium, molybdenum or an alloy thereof may be applicable thereto.

Then, the third conductive layer and fourth conductive layer are selectively removed through a photolithographic process to form a plurality of common electrodes 108 and pixel electrodes 118 made of the third conductive layer and fourth conductive layer within the pixel area.

Here, the third conductive layer and fourth conductive layer are selectively removed through the photolithographic process to form a first light blocking pattern 102 at the horizontal boundary of the pixel area so as to cover the data line 117 as well as form a second and a third light blocking pattern 109, 119 in a direction parallel to the gate line 116 at the vertical boundary of the pixel area.

As described above, the common electrode 108 may be formed with a double layer structure of an upper common electrode 108a having a low-reflectance characteristic and a lower common electrode 108b having a low-transmittance and high-conductance characteristic. An end of the first light blocking pattern 102 formed at an upper portion of the plurality of common electrodes 108 and the data line 117 is connected to the second light blocking pattern 109 parallel to the gate line 116, and the second light blocking pattern 109 is overlapped with part of the gate line 116 at a lower portion thereof. Here, the second light blocking pattern 109 is electrically connected to the common line 1081 exposed through the second contact hole 140b.

The pixel electrode 118 may be formed of the same material on the same plane as the common electrode 108. In other words, the pixel electrode 118 may be formed with a double layer structure of an upper pixel electrode 118a having a low-reflectance characteristic and a lower pixel electrode 118b having a low-transmittance and high-conductance characteristic. An end of the plurality of pixel electrodes 118 is connected to the third light blocking pattern 119 parallel to the gate line 116, and the third light blocking pattern 119 is overlapped with part of the common line 1081 at a lower portion thereof. Here, the third light blocking pattern 119 is electrically connected to a drain electrode 123 of the thin-film transistor exposed through a first contact hole 140a.

Furthermore, the first light blocking pattern 102, second light blocking pattern 109 and third light blocking pattern 119 may be formed with a double layer structure of an upper layer having a low-reflectance characteristic and a lower layer having a low-transmittance and high-conductance characteristic similarly to those of the common electrode 108 and pixel electrode 118. In other words, the first light blocking pattern 102 may be formed with a double layer structure of an upper first light blocking pattern 102a having a low-reflectance characteristic and a lower first light blocking pattern 102b having a low-transmittance and high-conductance characteristic, and the second light blocking pattern 109 may be formed with a double layer structure of an upper second light blocking pattern 109a having a low-reflectance characteristic and a lower second light blocking pattern 109b having a low-transmittance and high-conductance characteristic. Furthermore, the third light blocking pattern 119 may be formed with a double layer structure of an upper third light blocking pattern 119a having a low-reflectance characteristic and a lower third light blocking pattern 119b having a low-transmittance and high-conductance characteristic.

Then, though not shown in the drawing, the array substrate 110 configured as described above is attached to face the upper substrate by a sealant formed at an edge of display area in a state that a predetermined cell gap is maintained by a column spacer.

A liquid crystal display device having the foregoing configuration according to an embodiment of the present invention may be applicable to an image panel in a polarized glasses type stereoscopic image display device, and in this case, the second and the third light blocking pattern forms a black stripe, thereby performing the role of solving a vertical viewing angle problem in the polarized glasses type stereoscopic image display device.

Figure 8:
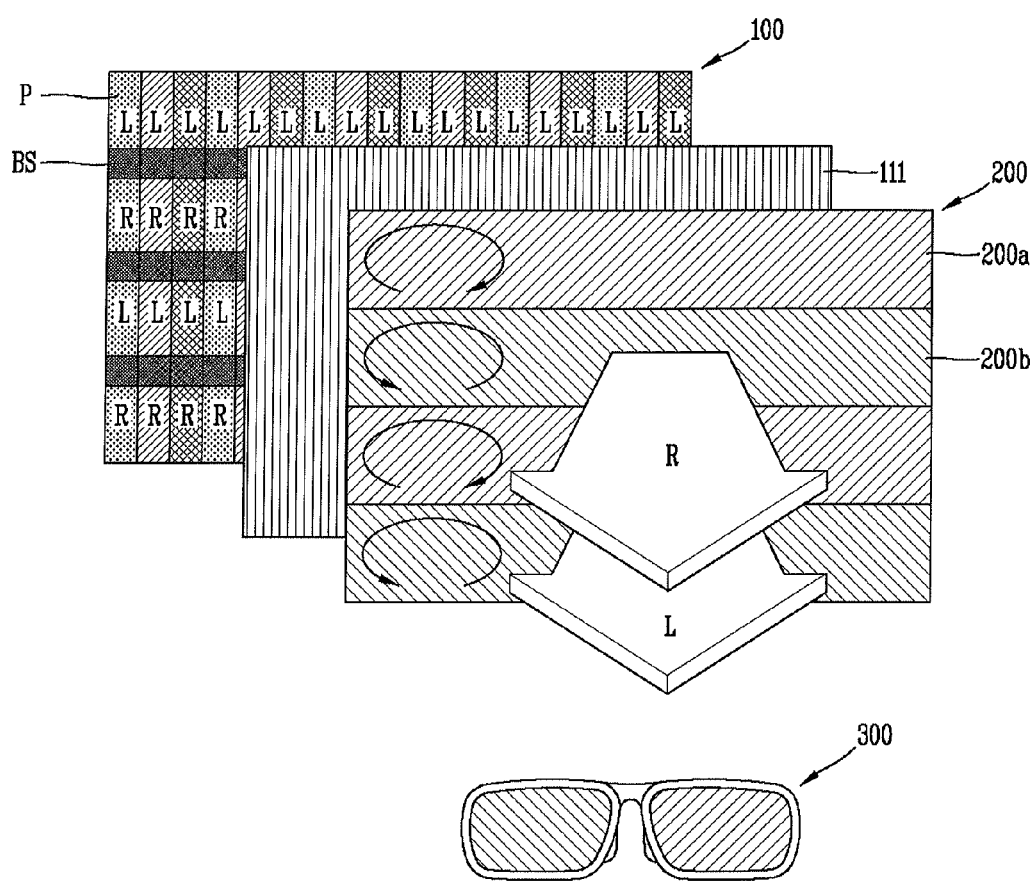
FIG. 8 is a view illustrating exemplarily illustrating the structure of a stereoscopic image display device using a liquid crystal display device according to an embodiment of the present invention as an image panel.

FIG. 8 is a view illustrating exemplarily illustrating the structure of a stereoscopic image display device using a liquid crystal display device according to an embodiment of the present invention as an image panel.

First, 3D display may be simply defined as "a system for artificially reproducing a 3D screen on the whole".

Here, the system may include both software technologies that can be shown in 3D and hardware in which contents made by the software technologies are actually implemented in 3D. The reason for including the software field is that contents configured with a separate software scheme are separately required for each stereoscopic implementation mode in case of 3D display hardware.

Furthermore, a virtual 3D display typically refers to a system capable of allowing a person to literally feel a virtual three-dimensional effect using binocular disparity shown due to our eyes being apart from each other by 65 mm in the horizontal direction among various factors with which he or she can feel a three-dimensional effect. In other words, our eyes see a little bit of different images (precisely speaking, slightly divided by left and right spatial information), respectively, due to binocular disparity even when looking at the same object, and when those two images are transferred to the brain via the retina, the brain merges them with each other to feel a three-dimensional effect. The virtual 3D display displays the two left and right images at the same time on a 2D display device using the foregoing scheme to implement a virtual three-dimensional effect through a design of sending them to each eye.

In order to display two channel images on one screen in such a virtual 3D display hardware device, each channel is alternately displayed on one screen by changing the rows one by one in one horizontal or vertical direction, for example. When the two-channel images are displayed on one display device, the right image is entered to the right eye of the viewer and the left image is entered to the right eye of the viewer in case of a glasses-free type stereoscopic display in the aspect of hardware structure. Furthermore, the right image is hidden not to allow the left eye to see, and the left image is hidden not to allow the right eye to see, respectively, in case of a glasses type stereoscopic display.

Such a method of displaying stereoscopic images can be largely classified into a glasses type and a glasses-free type.

For the glasses type stereoscopic display, there are an anaglyph mode in which blue and red color glasses are worn at the left and the right side, respectively, a polarized glasses mode in which polarized left and right glasses with different polarization directions are worn, a liquid crystal shutter mode in which a time-division screen is periodically repeated and glasses provided with a liquid crystal shutter for synchronizing images with that period are worn, and of them, the polarized glasses mode has an advantage capable of easily implementing 3D images on two images configured with 2D.

Referring to FIG. 8, the polarized glasses mode uses a polarization phenomenon, in which a pattern retarder 200 is disposed on a front surface of the image panel 100 to spatially divide the left and right images.

The pattern retarder 200 of the polarized glasses mode stereoscopic image display device denotes a film on which a predetermined pattern according to the location is formed to implement a polarization state in which the left and right images have directions perpendicular to each other.

For example, the pattern retarder 200 is provided with a substrate made of glass, though not shown in detail in the drawing, the alignment layer and birefringence layer are formed thereon. The alignment layer and birefringence layer have a regular pattern of the first region 200a and a regular pattern of the second region 200b. The first region 200a and second region 200b are formed with strips alternating with each other to correspond to the image lines of the image panel 100, and the regions 200a, 200b, respectively, have the same alignment direction. Here, the first region 200a and second region 200b have different alignment directions, for example, about 45° and 135°, respectively.

The image panel 100 may be configured with one of a liquid crystal display (LCD), a field emission display (FED), a plasma display panel (PDP), and an electroluminescent display (EL). Furthermore, when the image panel 100 is configured with a liquid crystal display device, an upper polarizing plate 111 having a light absorption axis in the horizontal direction, for example, is disposed between the image panel 100 and pattern retarder 200. Furthermore, though not shown in the drawing, a backlight unit is disposed at a lower portion of the image panel 100, a lower polarizing plate is disposed between the image panel 100 and backlight unit.

The upper polarizing plate 111 is an analyzer adhered onto the upper glass substrate of the image panel 100 to transmit only a specific linearly polarized light among incident light passing through the image panel 100.

The scheme of arranging the left and right images for each line is currently widely used. In other words, as illustrated in the drawing, the L image (L) is disposed in the odd line, and the R image (R) is disposed in the even line in the vertical direction. In this manner, when the L, R images (L, R) are displayed on the image panel 100, the user wears stereoscopic image viewing glasses 300 to view the L, R images (L, R) in a separate manner, thereby enjoying 3D images.

In other words, as described above, the patterned retarder 200 may include regular patterns of the first region 200a and regular patterns of the second region 200b which are alternatively disposed for each line. For example, the regular patterns of the first region 200a and the regular patterns of the second region 200b may be disposed for each line to have +45 and −45 degrees, respectively, with respect to an absorption axis of the upper polarizing plate 111. The regular patterns of the first region 200a and the regular patterns of the second region 200b delay the phases of light by $+\lambda/4$ and $-\lambda/4$, respectively, using a birefringent medium. An optical axis of the regular patterns of the first region 200a and an optical axis of the regular patterns of the second region 200b cross at right angles to each other. Accordingly, the regular patterns of the first region 200a are disposed to face lines displayed with the L image (L) of the image panel 100 to convert light of the L image (L) into a first polarization light (circularly or linearly polarized light). Furthermore, the regular patterns of the second region 122 are disposed to face lines displayed with the R image (R) of the image panel 100 to convert light of the R image (R) into a second polarization light (circularly or linearly polarized light). For example, the regular patterns of the first region 200a may be implemented by a polarization filter through which left-handed circular polarization passes, and the regular patterns of the second region 200b may be implemented by a polarization filter through which right-handed circular polarization passes.

Here, a polarization film through which only a first polarization component passes is adhered to the left eye lens of the stereoscopic image viewing glasses 300, and a polarization film through which only a second polarization component passes is adhered to the right eye lens of the stereoscopic image viewing glasses 300. Accordingly, the user wearing the stereoscopic image viewing glasses 300 views only the L image (L) through the left eye and views only the R image (R) through the right eye, thereby feeling an image displayed on the image panel 100 as a stereoscopic image.

Here, an example is illustrated that a circular polarization scheme is used for the polarized glasses scheme, but the present invention may not be necessarily limited to this, and a linear polarization scheme may be also used for the polarized glasses scheme.

A polarized glasses type stereoscopic image display device having the foregoing configuration may be characterized in that a predetermined black strip (BS) is formed at a vertical boundary of the pixel (P) to solve a vertical viewing angle problem. Here, for an example, the black stripe (BS) may use a light blocking pattern formed at a lower glass substrate of the image panel 100.

In other words, in the scheme of arranging the left and right images for each line, the L, R images (L, R) adjacent to each other in the vertical direction are divided correctly into a L image (L) and a R image (R), and as a result, only the L image (L) is entered to the left eye, and only the R image (R) is entered to the right eye.

According to the present invention, an amorphous silicon thin-film transistor using an amorphous silicon thin layer as an active layer has been described as an example, but the present invention may not be necessarily limited to this, and the present invention may be also applicable to using a polycrystalline silicon thin-film transistor using a polycrystalline silicon thin layer, an oxide thin-film transistor using an oxide semiconductor or the like.

In addition, the present invention may be also applicable to another type of display device fabricated using a thin-film transistor as well as a liquid crystal display device, for example, an organic light emitting diode display device in which organic light emitting diodes (OLEDs) are connected to driving transistors.

Although many subject matters have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

What is claimed is:

1. A method of fabricating a liquid crystal display device, the method comprising:
   forming a gate line and a data line crossed with each other on a first substrate to define a pixel area;
   forming a thin-film transistor at a crossed region between the gate line and the data line;
   forming a color filter within the pixel area of the first substrate;
   forming an insulating layer on the color filter and on the thin-film transistor;
   forming a plurality of common electrodes and pixel electrodes within the pixel area of the first substrate filter and on and in contact with the insulating layer;
   forming a light blocking pattern on and in contact with the insulating layer, the light blocking pattern being formed at a boundary of the pixel area,
   wherein the light blocking pattern comprises a first light blocking pattern at an upper portion of the data line to cover the whole data line, and a second light blocking pattern and a third light blocking pattern at an upper portion of the gate line and a common line to cover the gate line and the common line, respectively, and
   wherein the second light blocking pattern is formed in a direction parallel to the third light blocking pattern to be located adjacent to the third light blocking pattern; and
   attaching a second substrate to the first substrate,
   wherein the common electrode, the pixel electrode and the light blocking pattern are formed with double layers of an upper layer having a low-reflectance characteristic and a lower layer having a low-transmittance and high-conductance characteristic.

2. The method of claim 1, wherein the common line is formed in a direction parallel to the gate line to be located adjacent to the gate line.

3. The method of claim 1, wherein the first light blocking pattern and the data line are connected to the second light blocking pattern, and the second light blocking pattern is overlapped with part of the gate line.

4. The method of claim 1, wherein the plurality of pixel electrodes is connected to the third light blocking pattern, and the third light blocking pattern is overlapped with part of the common line.

5. The method of claim 1, wherein the upper layer is formed of a low-reflectance and low-transmittance material selected from a group consisting of a ceramic, metal oxide or semiconductor material.

6. The method of claim 1, wherein the lower layer is formed of a low-transmittance and low-resistance material selected from a group consisting of copper, aluminum, nickel, titanium, molybdenum or an alloy thereof.

7. The method of claim 1, wherein the light blocking pattern overlaps a common line and the color filter.

8. The method of claim 1, wherein the insulating layer is in direct contact with the color filter.

9. The method of claim 1, further comprising forming a column spacer on the light blocking pattern.

10. A liquid crystal display device, comprising:
   a gate line and a data line on a first substrate, and crossed with each other to define a pixel area;
   a thin-film transistor at a crossed region between the gate line and the data line;
   a color filter within the pixel area of the first substrate;
   an insulating layer disposed on the color filter and the thin-film transistor;
   a plurality of common electrodes and pixel electrodes within the pixel area of the first substrate and disposed on and in contact with the insulating layer;
   a light blocking pattern at a boundary of the pixel area to cover the boundary of the pixel area and disposed on and in contact with the insulating layer,
   wherein the light blocking pattern comprises a first light blocking pattern at an upper portion of the data line to cover the whole data line, and a second light blocking pattern and a third light blocking pattern at an upper portion of the gate line and a common line to cover the gate line and the common line, respectively, and wherein the second light blocking pattern is in a direction parallel to the third light blocking pattern to be located adjacent to the third light blocking pattern; and a second substrate attached to face the first substrate, wherein the common electrode, the pixel electrode and the light blocking pattern have double layers of an upper layer having a low-reflectance characteristic and a lower layer having a low-transmittance and high-conductance characteristic.

11. The liquid crystal display device of claim 10, wherein the common line is in a direction parallel to the gate line to be located adjacent to the gate line.

12. The liquid crystal display device of claim 10, wherein the light blocking pattern overlaps the common line and the color filter.

13. The liquid crystal display device of claim 10, further comprising a column spacer on the light blocking pattern.

* * * * *